(12) United States Patent
Vestberg et al.

(10) Patent No.: US 6,602,959 B2
(45) Date of Patent: *Aug. 5, 2003

(54) PREPARATION OF POLYOLEFIN BASED THERMOPLASTIC ELASTOMERS

(75) Inventors: Torvald Vestberg, Porvoo (FI); Ismo Lehtiniemi, Porvoo (FI); Tarja Mäkelä, Porvoo (FI)

(73) Assignee: Optatech Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/004,470

(22) Filed: Oct. 23, 2001

(65) Prior Publication Data

US 2002/0183452 A1 Dec. 5, 2002

Related U.S. Application Data

(63) Continuation of application No. 09/557,097, filed on Apr. 21, 2000, now abandoned, which is a continuation-in-part of application No. 08/817,918, filed on Jul. 10, 1997, now abandoned.

(51) Int. Cl.$^7$ .................. C08F 25/02; C08F 265/02
(52) U.S. Cl. ............... 525/242; 525/263; 525/301; 525/302
(58) Field of Search ............... 525/242, 263, 525/301, 302

(56) References Cited

U.S. PATENT DOCUMENTS 4,316,971 A    2/1982    Rim et al.
5,300,578 A    4/1994    Vestberg et al.
5,346,961 A    9/1994    Shaw et al.
5,981,665 A    11/1999   Vestberg et al. ............ 525/243

FOREIGN PATENT DOCUMENTS

| EP | 0014018 A1 | 8/1980 |
| EP | 0418861 A2 | 3/1991 |
| EP | 0476960 A1 | 3/1992 |
| EP | 0554058 A1 | 8/1993 |

OTHER PUBLICATIONS

Kissin, "Linear Low Density Polyethylene", Kirk–Othmer Encyclopedia of Chemical Technology, 4$^{th}$ Ed. vol. 17, p. 756 (1995).

Primary Examiner—James J. Seidleck
Assistant Examiner—Olga Asinovsky
(74) Attorney, Agent, or Firm—Birch, Stewart, Kolasch & Birch, LLP

(57) ABSTRACT

The invention relates to a method for manufacturing a sealable and peelable polymer blend, in which method polystyrene and an ethylene copolymer are first melt blended and the obtained blend is further mixed with the same ethylene copolymer either by melt blending or dry blending so that the final polymer blend contains 1–50% by weight polystyrene and 99–50% by weight ethylene copolymer. Ethylene copolymer is preferably ethylene/methyl (meth)acrylate, ethylene/ethyl(meth)acrylate, ethylene/butyl (meth)acrylate or ethylene/vinylacetate copolymer.

15 Claims, No Drawings

PREPARATION OF POLYOLEFIN BASED THERMOPLASTIC ELASTOMERS

CROSS REFERENCE TO RELATED APPLICATION

This application is a continuation of application Ser. No. 09/557,097 filed on Apr. 21, 2000now abandoned, which is a continuation-in-part of application Ser. No. 08/817,918 filed Jul. 10, 1997, now abandoned which is a national phase filing of PCT international application No. PCT/FI94/00479 which has an International filing date of Oct. 24, 1994 which designated the United States, the entire contents of which are hereby incorporated by reference.

BACKGROUND OF THE INVENTION

The invention concerns a polyolefin based thermoplastic elastomer which can be prepared without a separate vulcanization stage and which has polyacrylate as a dispersed phase and which has been achieved by polymerization of acrylate into the polyolefin matrix.

Thermoplastic elastomers are polymers which have the desirable processing properties of thermoplastics but have the same physical properties a vulcanized rubbers. This combination of properties generates materials having segments that are soft and elastic with low glass transition temperature ($t_K$) and a rigid, eventually crystalline, segment with a high glass transition temperature or a high melting point. The rigid and soft segments must be thermodynamically incompatible so that they form separate phases. Unlike conventional rubber, thermoplastic elastomers do not need a separate vulcanizing stage and can be processed using methods normally used with thermoplastics, such as extrusion, injection molding and blow molding. In addition, thermoplastic elastomers can also be reprocessed, for example when recycling material from the processing stage.

Thermoplastic elastomers can be divided into two main groups, block copolymers and thermoplastic/elastomer blends. A well-known example of block copolymers, which are thermoplastic elastomers, is the anionically polymerized block copolymer of styrene and butadiene (SBS) and the hydrogenized form of the same (SEBS). When these polymers are at room temperature, the soft and elastic phase is the continuous phase and the rigid phase, polypropylene, is dispersed. Here, the rigid polystyrene gives the material its strength, but during processing the temperature is raised over the glass transition temperature of polystyrene when it melts and the material can flow. The SBS thermoplastic elastomer, however, has poor weather resistance because of the butadiene double bonds. In SBS and SEBS polybutadiene and its hydrogenated form is the continuous phase, consequently they both have low oil resistance. Additionally, SEBS is expensive and requires a complicated preparation method.

Examples of materials that belong to the group of thermoplastic/elastomer blends are blends of polypropylene and ethylene/polypropylene rubber or ethylene/polypropylene/diene rubber. In these blends the rigid polypropylene phase is the continuous phase and the soft phase is dispersed, giving the material good oil resistance properties. These blends are made by blending the two main components and various additives in an extruder. Stabile phase separation results from curing the dispersed rubber phase (see, for example, U.S. Pat. No. 4,594,390).

The current invention describes a method to produce a thermoplastic elastomer with a polyolefin as a continuous phase and a rubber-like polyacrylate as a dispersed phase. This product is made in a reactor where crosslinking, if needed, can occur during polymerization. Thus, no separate vulcanization stage is needed. The resulting product has very good weather and oil resistance properties because the polyolefin is the continuous phase and because the elastomer is a polyacrylate. Hence, the current invention provides a method to produce a polyolefin based thermoplastic elastomer with a dispersed polyacrylate phase and without requiring a separate vulcanization stage.

SUMMARY OF THE INVENTION

The object of the current invention is to provide a new thermoplastic elastomer comprising a polyolefin/polyacrylate blend that has the polyolefin as the continuous phase and the polyacrylate as a dispersed phase.

A further object of the invention is to provide a new thermoplastic elastomer which maintains its dispersed polyacrylate structure during processing due to crosslinking of the dispersed elastic polyacrylate phase to the continuous polyolefin phase during polymerization.

Another object of the current invention is to provide a method for preparation of the new thermoplastic elastomer without employing a separate vulcanization stage.

The current invention provides for a polyolefin based thermoplastic elastomer with a dispersed polyacrylate phase that is polymerized into the polyolefin matrix. The invention further provides for a method for its preparation without a separate vulcanization stage. The acrylate used in the current invention has elastic properties and a glass transition temperature that is below room temperature. The acrylate forms a dispersed phase in the polyolefin matrix and, because polymerization occurs by the free radical technique, part of the acrylate chains are crosslinked to adjacent polyolefin chains. This provides good adhesion between the continuous polyolefin phase and the dispersed polyacrylate phase. Crosslinking can be controlled using varying ratios of diacrylate and acrylate. This crosslinking is especially important in cases where low adhesion between the polyolefin matrix and the polyacrylate is expected, for example when homopolyethylene or polypropylene is used. Here, because of the crosslinking, the soft dispersed polyacrylate is maintained in its dispersed form during processing when the polyolefin melts and becomes fluid.

The material could be produced by some of the methods given in the patent literature in which monomers are polymerized by free radical polymerization techniques into polyolefin matrix, e.g. by the Finnish patent 88170. In principal the acrylate monomer, and optionally diacrylate monomer, and the initiator are absorbed into polyolefin particles. The impregnation temperature is low enough so that no decomposition of the initiator occurs, yet high enough so that the monomer and the initiator can penetrate into the polyolefin particles. When all of the monomer and initiator have been absorbed, the temperature is elevated and the initiator decomposes and initiates the polymerization of the acrylate.

The polyolefin particles swell to some extent (depending on the amount of monomer added) during the impregnation, but maintain their particle structure. The polyolefin particle structure is also maintained during polymerization.

DETAILED DESCRIPTION OF THE INVENTION

Polyolefin

Useful polyolefins include high density polyethylene, low density polyethylene and linear low density polyethylene. The polyethylene can be a homopolymer or a copolymer. The co-monomer of ethylene can be vinyl acetate, vinyl chloride, propylene or some other $\alpha$-olefin, $C_1$-$C_7$-alkylacrylate and -methacrylate, glycidylacrylate and -methacrylate, dienes such as hexadiene-1,4, hexadiene-1,5, heptadiene-1,6, 2-methylpentadiene-1,4, octadiene-1,7, 6-methylheptadiene-1,5 and polyenes such as octatriene and dicyclopentadiene. Also ethylene-$\alpha$-olefin-polyene-terpolymeres are useful. Useful $\alpha$-olefins include propylene, butene, pentene, isoprene, hexene or their mixtures and useful polyenes include hexadiene-1,4, hexadiene-1,5, heptadiene-1,6, 2-methylpentadiene-1,4, octadiene-1,7, 6-methyl-heptadiene-1,5, octatriene, dicyclopentadiene. In cases where an ethylene copolymer is used, at least 50% by weight must be ethylene.

The polyolefin can also be comprised of polypropylene and its copolymers. Propylene copolymers must consist of over 50% by weight propylene and can be random- or block copolymers of propylene and ethylene. Also, other $\alpha$-olefins can be used as co-monomers and also dienes such as hexadiene-1,4, hexadiene-1,5, heptadiene-1,6, 2-methylpentadiene-1,4, octadiene-1,7, 6-methylheptadiene-1,5 and polyenes such as octatriene and dicyclo-pentadiene.

The polyolefin can be in any form, but preferably in the form of pellets with a diameter of 0.5–10 mm. Particle forms of the polyolefin facilitate after treatment washing and drying.

Acrylate monomer

Suitable monomers are acrylates and methacrylates whose polymers have low glass temperatures, that is, they are rubber-like at and below room temperature, preferably at temperatures below –20° C. The glass temperature of the polyacrylate specifies the lower operating temperature of the material; below the glass temperature the polyacrylate is rigid and inelastic and the elastomeric properties of the material are lost. Suitable acrylates are alkylacrylates having 1 or preferably 2 or more carbon atoms in the alkyl chain. Methacrylates having a glass temperature low enough are alkylmethacrylates having 4 or more, preferably 8 or more, carbon atoms in the alkyl chain. These monomers can be used alone or in mixtures of two or more monomers. The glass temperature of the final product can be tailored by adding small amounts of monomers having fewer carbon atoms in the carbon chain to the above mentioned monomers. One can further use acrylates and methacrylates as co-monomers; which in addition to an ester bond have other polar groups such as alkcoxy or hydroxy groups. Examples of these are methoxy- and ethoxy-acrylate, hydroxyethyl- and hydroxypropyl-methacrylate. By using these co-monomers the oil resistance of the product can be improved. Also, small amounts of other non-acrylate monomers that are polymerizable by free radical polymerization techniques can be co-polymerized with the above mentioned acrylates and methacrylates.

Amount of Acrylate

In order to produce a material that is a thermoplastic elastomer the acrylate must be in the majority although the exact amount to be polymerized into the polyolefin depends on the exact polyolefin used and whether or not oil is added. Here, majority means at least 50%, preferably greater than 50%, more preferably at least 60%, yet more preferably at least 64%, and still more preferably at least 69%. According to this invention, a polypropylene based material needs 50–90% by weight acrylate when no oil or filler are added. Thus, the polypropylene represents 50–10% by weight. Without oil and filler addition the amount of acrylate can vary from 50–90% by weight for homopolyethylene, down to 20–90% by weight for polyethylene qualities which contain up to 30% by weight co-monomers. The Examples indicate the effect of the amount of acrylate on the softness of the final product.

Addition of Oil

Adding oil also softens the final product, thus reducing the amount of acrylate needed to obtain a particular softness. The amount of added oil can be 0–40% by weight in the final product and can be added with the acrylate and initiator, allowing penetration of the oil into the polyolefin-polyacrylate particles during the impregnation and/or polymerization. Alternatively, oil can be added to the reactor after the finalized polymerization and can be impregnated into the polyolefin-polyacrylate particles at an elevated temperature. Yet another way to introduce oil into the polyolefin-polyacrylate particles is in an extruder. Suitable oils are those normally used to soften rubber, e.g. paraffinic, naphthenic, aromatic and synthetic oils as well as plasticizers for thermoplastics such as dioctylphthalat.

Addition of Fillers

Fillers can be added to modify the final product's properties. For example, fillers can raise the operating temperature and rigidity. The filler can be added to the polyolefin-polyacrylate blend in the extruder or can be included with the polyolefin used as raw material for the polymerization. Conventional fillers such as talc, kaolin, $CaCO_3$ and silica can be used and can be 0–70% by weight in the end product.

Composition of the End Product

The end product can also contain oil and fillers besides polyolefin and polyacrylate. Consequently, the amount of polyolefin and polyacrlate in the end product can vary within wide margins depending on the amount of oil and fillers used and also on the chosen polyolefin. If the polyolefin is polypropylene, the ratio of polypropylene/polyacrylate can be 0.1 to 2. If the polyolefin is polyethylene, the ratio can vary from from 0.1 to 5.

Crosslinking the Polyacrylate

Some acrylates spontaneously form gels without any diacrylate use, for example butylacrylate, and may eliminate the need to use diacrylate for crosslinking. The need for diacrylate also depends on the degree of adhesion between the discrete dispersed polyacrylate phase and the continuous polyolefin phase. As the adhesion between the phases increases the tendency of the dispersed polyacrylate to agglomerate and build bigger phase structures decreases. For example, if polyethylene, which contains polar groups, is used the adhesion can be so good that only small amounts or no diacrylate at all is needed. On the other hand, if a homopolyethylene or polypropylene is used, the adhesion between the phases is low and the polyacrylate must be crosslinked with diacrylate in order to enable processing of the dispersed polyacrylate without agglomeration and forming large polyacrlyate blocks. Low adhesion can also lead to phase invasion where the polyacrylate becomes a continuous or at least a co-continuous phase with the polyolefin. Crosslinking is preferably done in the reactor with an acrylate having two or more double bonds that can interact with different polyacrylate chains. Examples of suitable crosslinking agents are hexanediol diacrylate or dimethylacrylate. Generally the crosslinking agent is 0–15% by weight, based on the amount of acrylate. Other monomers having two or more double bonds, such as divinylbenezene, can also be used.

Initiator

Initiators conventionally used in free radical polymerization of vinyl monomers such as organic peroxides are suitable for the acrylate polymerization. Examples include benzoylperoxide, lauroylperoxide, t-butylperbenzoate, t-butyl-peroxy-2-ethylhexanate, t-butylperoxide, dicumylperoxide, di-t-butylperoxide, bis(t-butylperoxyisopropyl)benzene, t-butylperoxyisopropylcarbonate, 2,5-dimethyl-2,5-di-t-butylperoxyhexane, 2,5-dimethyl-2,5-di-(t-butylperoxy) hexyne-3, and azo compounds like azobisisobutyronitrile and azobisdimethylvaleronitrile.

More than one initiator can be used simultaneously so that the polymerization starts at a low temperature with a "low temperature initiator" and continues with a "high temperature initiator" at a higher temperature. The amount of the intiator can be between 0.001 and 2% by weight, preferably between 0.1 and 1% by weight, based on 100 weight parts of monomer.

Production, Including Impregnation and Polymerization

In principal, the production of this polyolefin-polyacrylate material can be made by the methods presented in the patent literature in which the acrylate and the initiator are first initiated into polyolefin particles and the acrylate is thereafter polymerized by elevating the temperature. The impregnation of the acrylate and the initiator can thus be made in the total absence of water, by adding some water, by adding water when more than half of the acrylate has been impregnated (these three methods are in principal described in the Finnish patents FI85496, FI86642 and FI88170) or in the presence of the total amount of water (as in US patent U.S. Pat. No. 4,412,938). Impregnation and polymerization can also be conducted simultaneously by slowly adding the acrylate and initiator to a water suspension containing polyolefin particles over the course of several hours and at an elevated temperature. (see German patent DE 2,907,662).

Finnish patent FI88170 presents an advantageous method whereby a maximum of about 65% by weight of acrylate is impregnated and polymerized into polyolefin in the polymerization stage. For softer elastomer, additional polyacrylate can be impregnated into the product obtained from the first polymerization stage, followed by a second polymerization. Using this approach the polyacrylate content can gradually be raised close to 100%. It is not necessary, however, to use totally independent or separate polymerizations. For example, near the end of the first polymerization, the temperature can be lowered to the impregnation temperature and the desired amount of acrylate and initiator can be pumped in. After these have been absorbed into the particles, the temperature is raised and the acrylate polymerized.

When polymerization is conducted in two or more stages and crosslinked polyacrylate is desired, the first polymerization is conducted without diacrylate. Here, the polyacrylate forms a discrete dispersed phase during the polymerization stage. During the other polymerization stage the added acrylate and diacrylate tend to migrate to the polyacrylate particles already formed in the polyolefin matrix, and crosslinking occurs there. This crosslinking is mainly between the added acrylate and diacrylate, but since this reaction occurs during polymerization in the presence of the existing polyacrylate particles, entanglements between the polymerizing and these preexisting particles are formed, creating physical crosslinks.

Properties of the Polymerization Product

The final product is a thermoplastic elastomer with a continuous phase of polyolefin crosslinked to a discrete dispersed phase of a rubber-like polyacrylate. The polyacrylate phase is in the majority. This final product maintains its two discrete phases during melt-processing. Other properties include: a Shore A hardness value greater than 50, preferably greater than 60, even more preferably greater than 70, 80 or 90 (test method is ISO 48), a modulus 100% of at least 0 Mpa, preferably greater than 1 Mpa, more preferably greater than 2 Mpa, even more preferably greater than 3 Mpa (test method is 37/1 mm/min), tensile strength of at least 1.9 MPa, preferably at least 3.2 MPa, more preferably at least 5.1 MPa, even more preferably at least 6.3, 7.1 or 8.4 MPa (test method is ISO 37), an elongation at break of at least 75%, preferably at least 107%, more preferably at least 209%, even more preferably at least 354%, 449% or 528% (test method is ISO 37), and a tear strength of at least 0 kN/m, preferably 2 kN/m, more preferably at least 8 kN/m, even more preferably at least 8 kN/m, 16 kN/m or 20 kN/m (test method is ISO 37).

The polymerization product has especially good oil resistance, weather resistance and ageing resistance due to the polyacrylate elastomer. The properties of the thermoplastic elastomers produced according to this patent depend on the polyolefin used: homo, block or random polypropylene, homopolyethylene or polyethylene containing co-monomers. The choice of polyeolefin especially influences temperature resistance, chemical resistance and adhesion properties. The acrylate type, amount and crosslinking density affect the hardness, toughness and elasticity of the final product. Ethylene based products are characterized by good heat and oil resistance. Fillers, which can be added to the starting polyolefin, allow tailoring of the product's properties.

Product Usage

The material produced of the current invention can be used in applications which other thermoplastic elastomers or conventional rubber is used, for example in the construction industry (sealing lists and packages), in the motor industry (protection bellow at power transmission points and interior material for instrument panels) and in the electrical industry (material for cables, contacts and different cases). This material can also be used for diverse mechanical articles like handles, wheels and sheaths.

The material can be processed by conventional processing methods used for thermoplastics, such as extrusion, injection molding and blow molding. Since polyolefin is the continuous phase, the material is well suited for co-extrusion with polyolefins. In processing, conventional additives like antioxidants, filler and oil can be added.

tricalsiumphosphate and sodiumdodecylbenzenesulphonate as a suspension agent. The temperature of the suspension water was the same as the impregnation temperature. After the water addition the temperature was raised so much that the initiator started to decompose and initiate the polymerization. The polymerization took 7–12 hours depending on the polyolefin quality. After polymerization, the product was washed and dried. Several different polyolefin-polyacrylate materials were made according to this model, see Table 1. All polypropylene based materials having more than 50% by weight acrylate were made in two stages so that the product from the first stage contained 50% by weight acrylate. Experiment 9 was also made in two stages and experiment 10 was made in three stages. The structure with the dispersed polyacrylate domains can be seen from FIG. 1, where the product from the first polymerization stage of experiment 15 has been photographed by a transmission electron microscope. In the picture, the dark dispersed phase is polyacrylate and the light continuous phase is polypropylene. The diameter of the polyacrylate particles is about 0.5 $\mu$m.

TABLE 1

Experiments 1–16.

| Exp Nr | Polyolefine[1] quality | MI[3] | Acrylate type[4] | Weight % | Diacrylate[6] w % | Initiator type[5] | Impreg. |C. | Polym. |C. | Gel[2] % |
|---|---|---|---|---|---|---|---|---|---|
| 1 | EVA28 | 5 | EHA | 40 | — | AIBN, BPO | 37 | 55–100 | 62 |
| 2 | EVA18 | 5 | EHA | 50 | — | AIBN, BPO | 41 | 55–100 | 56 |
| 3 | EVA18 | 10 | EHA | 50 | — | BPO, BPIC | 51 | 75–115 | 61 |
| 4 | EVA9 | 8 | EHA | 50 | — | BPIC | 69 | 90–120 | 54 |
| 5 | EBA27 | 4 | EHA | 50 | — | AIBN, BPO | 44 | 55–100 | 77 |
| 6 | EBA17 | 7 | EHA | 50 | — | BPO | 72 | 70–100 | 70 |
| 7 | EBA17 | 7 | BA | 50 | — | BPIC | 61 | 85–115 | 55 |
| 8 | EBA17 | 7 | BA | 50 | 1.0 | BPIC | 69 | 85–115 | 60 |
| 9 | EBA7 | 1 | BA | 64 | 0.5 | t-BPB | 86 | 90–120 | 83 |
| 10 | LLDPE | 65 | BA | 69 | 1.6 | DHBP | 101 | 110–135 | 53 |
| 11 | Random PP | 20 | BA | 50 | 0.1 | DYBP | 116 | 125–150 | 53 |
| 12 | Random PP | 20 | BA | 68.5 | 1.6 | DYBP | 112 | 130–150 | 74 |
| 13 | Random PP | 20 | BA | 67 | 3.1 | DYBP | 108 | 130–150 | 67 |
| 14 | Random PP | 20 | BA | 74 | 1.5 | DYBP | 117 | 130–150 | 74 |
| 15 | Random PP | 20 | EHA | 68.4 | 1.6 | DYBP | 116 | 130–150 | 64 |
| 16 | Block PP | 40 | BA | 67 | 3.0 | DYBP | 120 | 135–150 | 76 |

[1])All polyolefines used are Neste*s commercial qualities.
[2])Gel content was measured in boiling xylene under 16 hours.
[3])Melt index is determined for polyethylene qualities at 190 | C. and 2.16 kg and for polypropylene at 230 | C. and 2.16 kg.
[4])EHA = ethylexylacrylate, BA = butylacrylate
[5])AIBN = azobisisobutyronitrile, BPO = benzoylperoxide, BPIC = tert-butylperoxyisopropylcarbonate, t-BPB = tert-butylperoxybenzoate, DYBP = 2,5-dimehtyl,2,5-di(tert-butylperoxy)-hexyne-3, DHBP = 2,5-dimethyl 2,5-di)tert-butylperoxy)hexane.
[6])Diacrylate = 1,6-hexanedioldiacrylate

EXAMPLES

Polyolefin pellets, acrylate, initiator and, in some cases 1,6-hexanediole diacrylate, were added to the reactor. The reactor was filled and emptied three times with 7–8 bar nitrogen in order to remove oxygen from the reactor. After that, the temperature was raised to the impregnation temperature and kept there, stirring continuously, until the mojor port of the acrylate and the initiators were impregnated. The impregnation time was 1–3 hours depending on the polyolefin quality. Thereafter, the suspension water, also rinsed with nitrogen, was added. The suspension water contained The polymer materials made according to Table 1 were injection moulded to sheets having the size of 80×80 mm and the thickness of 2 mm, at 165–205° C., depending on the polyolefine used. The necessary test bars were punched from the sheets. The mechanical properties are in Table 2. Elongation at break and tensile strength have been measured from test rods which are punched transverse to the flow direction of the injection moulding.

TABLE 2

Mechanical properties of the materials of the experiments 1–16.

| Exp. Nr | Polyolefine quality | Acrylate type | % | Di-Acr. w % | Gel % | elong. at break[1] % | tensile strength[2] MPa | IRHD[3] | compr. set[4] % | tension set[5] % |
|---|---|---|---|---|---|---|---|---|---|---|
| 1 | EVA28 | EHA | 40 | — | 62 | 158 | 5.5 | 65 | — | 24 |
| 2 | EVA28 | EHA | 50 | — | 56 | 177 | 3.2 | 52 | — | 17 |
| 3 | EVA18 | EHA | 50 | — | 61 | 107 | 2.7 | 61 | — | 20 |
| 4 | EVA9 | EHA | 50 | — | 54 | 90 | 3.2 | 75 | — | 23 |
| 5 | EBA27 | EHA | 50 | — | 77 | 75 | 1.9 | 56 | — | 16 |
| 6 | EHA17 | EHA | 50 | — | 70 | 449 | 5.4 | 67 | — | 16 |
| 7 | EBA17 | BA | 50 | — | 55 | 528 | 6.1 | 75 | 30 | 33 |
| 8 | EBA17 | BA | 50 | 1.0 | 60 | 354 | 7.1 | 76 | 20 | 25 |
| 9 | EBA7 | BA | 64 | 0.5 | 83 | 209 | 6.3 | 75 | 22 | 16 |
| 10 | LLDPE | BA | 69 | 1.6 | 73 | 175 | 5.1 | 82 | 38 | 37 |
| 11 | Random PP | BA | 50 | 0.1 | 53 | 198 | 8.4 | 97 | — | 66 |
| 12 | Random PP | BA | 68.5 | 1.6 | 74 | 169 | 7.3 | 90 | 43 | 40 |
| 13 | Random PP | BA | 67 | 3.1 | 67 | 142 | 8.9 | 92 | 31 | 32 |
| 14 | Random PP | BA | 74 | 1.5 | 74 | 128 | 5.6 | 81 | 26 | 16 |
| 15 | Random PP | EHA | 68.4 | 1.6 | 64 | 127 | 5.9 | 88 | 43 | 43 |
| 16 | Block PP | EHA | 72.5 | 3.5 | | | | | | |

[1] Elongation at break measured by ISO 37
[2] Tensile strength measured by ISO 37
[3] Hardness, IRHD, measured by ISO 48
[4] Compression set after 24 hours at room temperature by ISO 815
[5] Tension set after 24 hours at room temperature by ISO 2285

The amount of polyacrylate has the biggest effect to the hardness of the product, the higher amount of polyacrylate the softer product, see experiments 1 and 2 and experiments 11–15. To the mechanical properties, the polyolefine quality also effects most to the hardness, compare 2, 3 and 4 as well as 5 and 6. The amount of diacrylate affects all mechanical properties. The higher amount of diacrylate improves strength, compression set and tension set but decreases the elongation at break, comare 7 and 8 as well as 12 and 13.

In table 3 the product from the experiment 7 is compared with commercial SBS-quality, Dexcos Vektor-2411D, at 55° C. These both have about the same hardness and the same highest operating temperature, 60–70° C. From the table it can be seen that SBS has considerably lower oil resistance than the product from the experiment 7. Also, in table 3 is compared the product from the experiment 13 with the thermoplastic elastomer Santopren 201-80 at 100° C. The product from the experiment 13 has polypropylene as a polyolefine and a continuous phase and it can therefor regarding to the temperature resistance, be compared with Santopren which also had polypropylene as a continuous phase. Santopren has ethylene-propylene-diene rubber as an elastomeric phase. The both have same hardness. From the table it can be seen that the product from the experiment 13 has considerably better oils resistance than Santopren in ASTM1- and ASTM2-oils. In ASTM3-oil Santopren is a little better.

TABLE 3

Oil resistance, measured as swelling, of the material made according to this invention compared with commercial thermpolastic elastomers, by ISO 1817. For experiment 7 and SBS was used 55 | C. and for experiment 13 and Santopren was used 100 | C..

| Exp Nr | Material | Hardness IRHD | ASTM1 | | | ASTM2 | | | ASTM3 | | |
|---|---|---|---|---|---|---|---|---|---|---|---|
| | | | 1 day % | 3 days % | 7 days % | 1 day % | 3 days % | 7 days % | 1 day % | 3 days % | 7 days % |
| 7 | EBA17-PBA | 75 | 8 | 14 | 16 | 14 | 28 | 34 | 51 | 89 | — |
| | SBS, Vektor-2411D | 82 | 35 | 50 | 52 | 98 | 127 | — | — | — | — |
| 13 | PP-PBA | 92 | — | 8 | 10 | — | 22 | 24 | — | 58 | 58 |
| | Santopren 201-80 | 91 | — | 18 | 19 | — | 31 | 31 | — | 52 | 54 |

The aging resistance of the material at high temperature was tested by aging the material at 70° C. during 168 hours. The elongation at break and tensile strength were measured for unaged and aged materials from test bars punched in flow direction. The material from experiment 7 was compared with a commercial SBS-quality, Enichem Europrene SOL T166, and with a commerical SEBS-quality, Neste polymer Compounds 6503. These three materials are comparable by hardness and operating temperature. From table 5 it can be seen that the material from experiment 7 has considerably better aging resistance at an elevated temperature. Apart from the fact that the material from experiment 7 was not stabilized with antioxidants. In the table there is also compared a polypropylene based material made according to example 13 with Santopren-quality 201-80.

TABLE 5

Changing of the elongation at break and tensile strength during aging at 70 | C. for 168 hours. The chance is given as percent chance between the unaged and aged materials.

| Expr Nr | Material | Hardness IRHD | Elongation at break % | Tensile strength MPa | Chance, Elongation at break | % Tensile strength |
|---|---|---|---|---|---|---|
| 7 | EBA17-PBA | 75 | 129 | 5.7 | +4.9 | +7.5 |
|  | SBS 166 | 75 | 540 | 11.3 | −15.2 | −36.2 |
|  | SEBS 6503 | 75 | 305 | 5.8 | −21.0 | −4.9 |
| 13 | PP-BPA Santopren 201-80 | 91 | 126 | 10.3 | −15.4 | +5.1 |

Experiments 17–20

A material made according to experiment 7 but with a diacrylate amount 0.5% by weight, was filled with three different fillers, 23–41% by weight in the end product, in a screw extruder at 200° C. From table 4 can be seen that hardness is rising together with a rising filler content. Other mechanical properties remain unchanged when compared with the unfilled material of experiment 17.

The composition of the end product is thus 10% by weight oil, 63% by weight polybutylacrylate and 27% by weight polypropylene. The material was injection moulded to sheets from which test bars were punched at flow direction. From the results in table 6 can be seen that by oil addition the material has become softer without the loss of other mechanically good properties, compression set and tension set have even improved.

TABLE 4

Influence of fillers on the mechanical properties of the product of experiment 17.

| Exp Nr | Polyolefine quality | Acrylate type | % | Diacr. Weight % | Gel % | Elong. at break[1] % | Tensile str.[2] MPa | IRHD[3] | Compression set[4] % | Tension set[5] % |
|---|---|---|---|---|---|---|---|---|---|---|
| 17 | EBA17 | Ba | 50 | 0.5 | 63 | 360 | 6.6 | 78 | 28 | 32 |
| 18[4] | EBA17 | BA | 50 | 0.5 | — | 270 | 6.2 | 84 | 24 | 32 |
| 19[7] | EBA17 | BA | 50 | 0.5 | — | 238 | 6.0 | 87 | 30 | 39 |
| 20[4] | EBA17 | BA | 50 | 0.5 | — | 322 | 7.1 | 87 | 27 | 41 |

[1] Elongation at break measured by ISO 37
[2] Tensile strength measured by ISO 37
[3] Hardness, IRHD, measured by ISO 48
[4] Compression set after 24 hours at room temperature by ISO 815
[5] Tension set after 24 hours at room temperature by ISO 2285
[6] Added filler talc, Finntalk 20 10 vol % (23% by weight)
[7] Added filler CaCO$_3$ Nordkrone 40 20 vol % (41% by weight)
[8] Added CaCO$_3$, Winnofil S 20 vol % (40% by weight)

Experiments 21, 22 and 23

To a material which is made exactly according experiment 13 was added 10% by weight oil and 0.3% by weight antioxidant, Irganox 1520, in a single-screw extruder at 205° C. A paraffin oil, Nypar 40 (Neste-Alfa Oy), and a naphthenic oil, Nytex 840 (Nyn Petroleum) were used as oils.

TABLE 6

Addition of 10% by weight oil to a polypropylene-polyacrylate material.

| Exp. | oil quality | % by weight | Elongation at break[1] % | Tensile strength[2] MPa | IRHD[3] | Compression set[4] % | Tension set[3] % |
|---|---|---|---|---|---|---|---|
| 21 | — | — | 138 | 9.3 | 93 | 37 | 32 |
| 22 | Nytex 840 | 10 | 131 | 8.0 | 88 | 33 | 27 |
| 23 | Nypar 40 | 10 | 142 | 8.5 | 89 | 33 | 25 |

[1] Elongation at break measured by ISO 37
[2] Tensile strength measured by ISO 37
[3] Hardness, IRHD, measured by ISO 48
[4] Compression set after 24 hours at room temperature by ISO 815
[5] Tension set after 24 hours at room temperature by ISO 2285

Experiments 24 and 25

These experiments were made in the same way as experiment 13 with the difference that to the reactor it was charged 6% by weight oil together with the acrylate in the second polymerisation stage. The whole amount of oil was absorbed into the pellets and the end product*'s composition is thus 6% by weight oil, 70% by weight polybutylacrylate and 24% by weight polypropylene. From the test results in table 7 down can be seen that the material, compared to experiment 13 becomes considerably softer and compression set becomes a little better. Elongation at break and tensile strength decrease a little.

Experiment 26

This experiment was made in the same way as experiments 24 and 25 with the difference that oil was added in the both polymerisation stages, 6% by weight in the first and 11% by weight in the second polymerisation stage. This gives the final composition: 14% by weight oil, 30% by weight polypropylene and 56% by weight butylacrylate (inclusive 2.2% by weight diacrylate). Oil was Nytex 940. Test results can be seen in table 7 down.

Experiments 27 and 28

As starting material for oil and filler experiments was used a polypropylene based material which made according to experiment 13, with the difference that the amount of butylacrylate in the first polymerisation stage was 37% by weight and in the second polymerisation stage 34% by weight (+3% by weight). This gives an end composition of 60% by weight polybutylacrylate and 40, including 3% by weight diacrylate.

TABLE 7

Influence of oil and fillers to the properties.

| Exp. | Oil quality | w % | PP w % | PBA w % | Filler w % | Elong. at break[1] % | Tensile str.[2] MPa | IRHD | Compression set[4] % | Tension set[5] % |
|---|---|---|---|---|---|---|---|---|---|---|
| 24 | Nypar 40 | 6 | 24 | 70 | — | 118 | 6.9 | 84 | 31 | 31 |
| 25 | Nytex 840 | 6 | 24 | 70 | — | 126 | 7.5 | 85 | 27 | 29 |
| 26 | Nytex 840 | 14 | 30 | 46 | — | | | | | |
| 27 | Nypar 40 | 20 | | | | | | | | |
| 28 | Nypar 40 | 20 | | | | | | | | |

[1] Elongation at break measured by ISO 37
[2] Tensile strength measured by ISO 37
[3] Hardness, IRHD, measured by ISO 48
[4] Compression set after 24 hours at room temperature by ISO 815
[5] Tension set after 24 hours at room temperature by ISO 2285

What is claimed is:

1. A thermoplastic elastomer produced by the process which comprises:

a) combining polyolefin particles, an acrylate monomer and a free radical polymerization initiator; and b) heating the resultant mixture to impregnate and polymerize said acrylate in said polyolefin particles, and to crosslink said acrylate with diacrylate to produce a polyolefin-polyacrylate blend, wherein crosslinked polyacrylate comprises more than 50% and forms a dispersed phase in a continuous phase of said polyolefin after melt blending.

2. A thermoplastic elastomer produced by the process which comprises:

a) combining polyolefin particles, an acrylate monomer and a free radical polymerization initiator; and b) heating the resultant mixture to impregnate and polymerize said acrylate in said polyolefin particles, and to crosslink said acrylate with diacrylate to produce a polyolefin-polyacrylate blend, wherein the crosslinked polyacrylate comprises more than 50% and forms a dispersed phase in a continuous phase of said polyolefin after melt blending, wherein said polyolefin is polypropylene or polypropylene containing units derived from comonomers, polyethylene or polyethylene containing units derived from comonomers, and said acrylate monomers are alkyl acrylates or alkyl methacrylates with 4 or more carbon atoms in the alkyl chain.

3. The method according to claim 2, wherein said acrylate monomers are those which, when polymerized, have glass temperatures lower than room temperature.

4. The thermoplastic elastomer, according to claim 1, wherein said polyolefin is polypropylene, polypropylene containing units derived from comonomers, polyethylene or polyethylene containing units derived from comonomers.

5. The thermoplastic elastomer, according to any one of claims 1, 2 or 3, wherein the weight proportion between the polyolefin and the polyacrylate in the blend is 0.1–5.

6. The thermoplastic elastomer produced by the process according to any one of claims 1, 2 or 3, said process further comprising the addition of 0–40% by weight of oil into the polymerisation or during a separate extrusion stage in order to make the material softer.

7. The thermoplastic elastomer, according to any one of claims 1, 2 or 3, wherein the end product contains 0–70 % by weight of fillers.

8. The thermoplastic elastomer, according to any one of claims 1, 2 or 3, which further contains oil and fillers.

9. The thermoplastic elastomer, produced by the process according to any one of claims 1, 2, or 3, wherein said process further comprises extrusion, injection moulding, blow moulding and coextrusion with polyolefins.

10. The thermoplastic elastomer, according to claim 1, wherein said elastomer has oil and weather resistance properties.

11. A thermoplastic elastomer comprising a polyolefin as a continuous phase in minority and polyacrylate as a soft dispersed phase in majority, wherein said polyacrylate phase is crosslinked and the two phases do not undergo a phase transition during melting.

12. A thermoplastic elastomer according to claim 11, wherein said polyacrylate phase has elastic properties.

13. The thermoplastic elastomer according to claim 11, wherein said polyacrylate phase is in the majority, has elastic properties and is cross-linked into said polyolefin phase such that the two phases do not undergo a phase transition during melting.

14. The thermoplastic elastomer according to claim 11, wherein said polyacrylate is polybutylacrylate, wherein said polybutylacrylate is in the majority and is cross-linked and no phase transition occurs upon melting.

15. The thermoplastic elastomer according to claim 11, wherein the polyacrylate has a glass transition temperature less than room temperature.

* * * * *